United States Patent
Kogler et al.

(10) Patent No.: US 11,619,306 B2
(45) Date of Patent: Apr. 4, 2023

(54) SEAL ASSEMBLY

(71) Applicant: AKTIEBOLAGET SKF, Gothenburg (SE)

(72) Inventors: Christian Kogler, Oberkurzheim (AT); Wolfgang Swete, Knittelfeld (AT); Jesko-Henning Tanke, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 87 days.

(21) Appl. No.: 17/189,806

(22) Filed: Mar. 2, 2021

(65) Prior Publication Data

US 2021/0301924 A1 Sep. 30, 2021

(30) Foreign Application Priority Data

Mar. 30, 2020 (DE) .......................... 102020204090.7

(51) Int. Cl.
*F16J 15/324* (2016.01)
*F16J 15/3204* (2016.01)

(52) U.S. Cl.
CPC ......... *F16J 15/324* (2013.01); *F16J 15/3204* (2013.01)

(58) Field of Classification Search
CPC .... F16J 15/00; F16J 15/16; F16J 15/50; F16J 15/52; F16J 15/26; F16J 15/3204; F16J 15/324; F16J 15/3244; F16J 15/3248; F16J 15/3268
USPC .......................................... 277/549
See application file for complete search history.

(56) References Cited

U.S. PATENT DOCUMENTS

| | | | | |
|---|---|---|---|---|
| 3,472,519 A | * | 10/1969 | Gehret | F16C 33/726 277/552 |
| 6,102,409 A | * | 8/2000 | Furuyama | F16J 15/3232 277/562 |
| 6,695,576 B2 | * | 2/2004 | Rosso | F04D 29/106 415/113 |

* cited by examiner

*Primary Examiner* — Nathan Cumar
(74) *Attorney, Agent, or Firm* — J-Tek Law PLLC; Scott T. Wakeman; Mark A. Ussai

(57) ABSTRACT

A seal assembly for sealing a grease lubricated large rolling-element bearing includes a radial shaft seal having at least one seal lip configured to sealingly abut against a shaft to seal a bearing interior and substantially prevent a grease discharge from the bearing and a grease flow regulation device, such as an annular pumping ring, for regulating a grease pressure at the at least one seal lip, the grease flow regulation device being mounted adjacent to the radial shaft seal at a side of the radial shaft seal that is intended to face the bearing interior in an installed state.

18 Claims, 4 Drawing Sheets

A SEAL ASSEMBLY

CROSS-REFERENCE

This application claims priority to German patent application no. 10 2020 204 090.7 filed on Mar. 30, 2020, the contents of which are fully incorporated herein by reference.

TECHNOLOGICAL FIELD

The present disclosure is directed to a seal assembly for sealing a grease lubricated bearing, in particular for sealing a grease lubricated large rolling-element bearing, and a bearing assembly including such a seal assembly.

BACKGROUND

Large rolling-element bearings, such as, for example, large rolling-element bearings that are used to support a main shaft of a wind turbine, are subjected to high loads that lead to a bending or running inaccuracy of the supported shaft. These running inaccuracies or bends impair ability of the radial seal lips, which are configured to seal a bearing interior of the bearing assembly, to maintain contact with a shaft. Due to the running inaccuracies, the radial shaft seal lip does not abut uniformly strongly against the shaft over its circumference. An oil lubrication of such a bearing is also to be avoided, since the constant changing of the seal angle along the circumference leads to difficulties in sealing. Such bearing assemblies are therefore usually lubricated with a grease.

However, grease lubricants have the disadvantage that due to poorer heat dissipation compared to oil lubrication, a higher frictional heat arises, which in turn results in an increase of the temperature and of the thermal deformations, as well as accelerated seal wear and reduced energy efficiency of the entire system. This effect is increased with enlarged seal diameter.

A further problem is that in grease lubricated systems the grease often adheres to the seals such that the exchange of grease is limited by the lubrication channels provided on the bearing.

SUMMARY

It is therefore an aspect of the present disclosure to provide a seal assembly for grease lubricated bearing assemblies that enables a grease exchange on the seal lip and improved heat dissipation so that the service life of the seal assembly can be increased.

In the following a seal assembly is described for sealing a grease lubricated bearing, in particular a grease lubricated large rolling-element bearing, wherein the seal assembly includes a main seal having at least one seal lip that sealingly abuts radially against a seal contact surface, in particular a shaft, and in the following is referred to as a "radial" shaft seal regardless of the precise geometric embodiment. Furthermore, the main seal or radial shaft seal is configured to seal a bearing interior and to prevent a grease discharge from the bearing. However, on the other hand, in order to generate as little heat as possible it is necessary that a certain proportion of grease reaches the at least one seal lip of the main seal in order to lubricate it and thus to reduce the friction of the seal lip against the seal contact surface.

In order to reduce the pressure of the grease accumulation against the seal lip and thus the pressure of the grease against the seal lip, but simultaneously to ensure a grease exchange at the seal lip, a so-called grease flow regulation element, sometimes referred to as a pumping ring, is arranged on a side of the radial shaft seal facing the bearing interior in the installation situation, which grease flow regulation element is configured to regulate a grease pressure and a grease flow at the at least one seal lip.

Here, as a preferred exemplary embodiment shows, the grease flow regulation element can include through-openings that fluidically connect to a grease receiving space that is formed between the grease flow regulation element and the main seal. A grease entry into the grease receiving space can thereby be reduced or regulated. In this case this grease entry is controlled by a deformation of the seal lip of the main seal due to the running inaccuracy of the shaft, which shall be discussed in more detail below, which enlarges and reduces the grease receiving space. This enlargement or reduction of the grease receiving space leads to a pumping effect on the grease in the grease receiving space so that grease can be actively suctioned through the through-openings into the grease receiving space, or pressed out from it.

According to a further preferred exemplary embodiment, the grease flow regulation elements can furthermore also be shaped like a seal ring and include a lip element facing the seal contact surface. However, in contrast to normal seal rings or a radial shaft seal, the grease flow regulation element, and in particular the lip element, is dimensioned such that in the resting state of the bearing assembly an annular gap remains between the seal contact surface and the lip element. Due to this annular gap, grease can also alternatively or additionally pass from the bearing interior onto the radial shaft seal lip. However, at the same time the entry of grease onto the seal lip is reduced, so that the grease exchange and the inflow is regulatable.

Such seal assemblies are advantageous in particular in large rolling-element bearings for supporting wind turbine shafts, wherein the bearing is not installed with a horizontally oriented axis, but rather slightly angled. Due to this the grease is additionally pressed from the bearing interior toward the radial shaft seal on the one side of the bearing. The grease flow regulation element that is disposed between the bearing interior and the radial shaft seal can advantageously reduce this grease pressure and thus make it possible that the radial shaft seal can abut against the main shaft with reduced or unincreased abutment pressure.

According to a further advantageous exemplary embodiment, the annular gap is dimensioned such that the nominal gap dimension is smaller than an expected running inaccuracy of the seal contact surface. Since the shaft to be supported and thus also the sealing contact surface is deformed due to the load or is slightly misaligned, for example by the weight of rotor blades to be carried, during operation, the sealing contact surface is subject to concentricity inaccuracy. This running inaccuracy causes the size of the ring gap to vary over the circumference during operation. By dimensioning the ring gap to be smaller than the running inaccuracy, a crescent-shaped gap is formed between lip element and seal contact surface, and the lip element partially contacts the seal contact surface. This contact leads to a hydrodynamic influence of the grease flow regulation element on the lubricating grease, so that the lubricating grease is set into motion and an accumulation of grease in the region of the radial shaft seal lip is reduced. Here grease can be pumped back to the bearing interior by this hydrodynamic influence. In contrast, the large gap arising on the other side of the contact point allows an easier entry of grease onto the seal lip of the radial shaft seal so that a supplying and discharging of the grease to the radial shaft seal can be generated and regulated.

Alternatively or additionally thereto, or in the case that the running inaccuracy is very small, the grease flow regulation element can be disposed in the seal assembly such that even in the resting state, the ring gap has a varying gap dimension with respect to the seal contact surface over the circumference. Here it is preferred in particular that even in the resting state, in the installed state a crescent-shaped gap is formed between seal contact surface and lip element. As mentioned above, the grease flow between bearing interior and radial shaft seal ring can thereby be regulated and controlled, so that even with very low running inaccuracies, reduced grease pressure and sufficient grease exchange can be provided on the radial shaft seal.

Of course, a combination of a gap dimension adapted to the running inaccuracy and offset arrangement is also possible.

According to a further advantageous exemplary embodiment the grease flow regulation element is annular-disc shaped and includes an annular disc shaped carrier onto which the lip element is attached. Here the annular disc shaped carrier and lip element can be manufactured one-piece or multi-piece from the same material, in particular an elastomeric material, or from different materials.

The annular disc shaped carrier in turn has a radial extension (width), which, as a further advantageous exemplary embodiment shows, varies over the circumference, so that in turn in the installation and/or in the resting position and/or in operation, an annular gap varying over the circumference is formed between contact surface and lip element of the grease flow regulation element. The desired grease flow regulation can also thereby be achieved alone or in combination with the adapted ring gap or a malpositioned installation position.

According to a further advantageous exemplary embodiment, the lip element of the grease flow regulation element furthermore includes a slip surface that faces the seal contact surface and on which at least one grease transport structure is formed which, in a rotational direction dependent manner and upon contact with the seal contact surface can advantageously transport grease from the radial shaft seal toward the bearing interior. Here it is advantageous in particular when the grease transport structure is formed as a plurality of grease-transport grooves and/or grease-transport ribs, wherein the grease-transport grooves or grease-transport ribs are disposed equally spaced over the circumference of the seal lip. Such a grease transport structure can increase the pumping effect of the grease flow regulation element and thus the grease transport from a grease receiving space, which is formed between the grease flow regulation element and radial shaft seal, toward the bearing interior.

These grease transport structures are hydrodynamic auxiliary structures that are activated upon contact with the seal contact surface and thus generate a grease flow that acts away from the radial shaft seal, against the normal direction of the grease pressure. Therefore the part of the lip element that is not in contact with the seal contact surface is penetrated by grease in the direction of the radial shaft direction, while the grease on the other side (in the contact region) is transported out of the grease receiving space, so that a grease flow is generated that is driven by the running inaccuracy of the seal contact surface of the flow-regulation element. This grease flow is additionally supported by a deformation of the radial shaft seal lip due to the running inaccuracy, which enlarges and reduces the grease receiving space, which also leads to a pumping effect on the grease in the grease receiving space between the grease regulation flow element and radial shaft seal ring.

It can thereby be achieved in particular that the grease pressure on the radial shaft seal lip is reduced without the radial shaft seal running dry, which would lead to increased heat development. The grease flow regulation element thus serves not only as a grease flow regulation, but simultaneously has a cooling effect for the entire bearing assembly. Furthermore, by providing such a grease flow regulation element, heat can be dissipated from the radial shaft seal, since cooling grease is guided onto the radial shaft seal. This cooling effect can be used such that higher running speeds or a longer service life of the bearing is made possible.

In order to avoid an excessive underpressure or overpressure in the grease receiving space between the grease flow regulation element and radial shaft seal, or in order to ensure sufficient grease exchange, in a further preferred exemplary embodiment the above-described at least one through-opening, which fluidically connects the bearing interior and the grease receiving space to each other, can be used in the grease flow regulation element. A plurality of these through-openings are preferably distributed identically spaced over the circumference of the grease flow regulation element.

According to a further advantageous exemplary embodiment, the through-openings are disposed in the annular disc shaped carrier of the grease flow regulation element.

According to a further advantageous exemplary embodiment, the radial shaft seal and the grease flow regulation element are disposed on a common seal carrier and are supported by it. The seal assembly can thereby be easily arranged on the bearing to be sealed and installed.

The assemblies described can be embodied in the same manner both for axial and radial seal contact surfaces, and attached both to fixed and rotating bearing elements. They can also be combined with main seals including axial slip surfaces. Here the mechanical embodiment of the main seal, which presses the lip against its counter-surface, can be embodied both with an encircling coil spring ("worm spring", "garter spring"), and with leaf spring elements ("finger spring").

A further aspect of the present disclosure relates to a bearing assembly, in particular a large rolling-element bearing assembly of a wind turbine for supporting a main shaft, wherein the bearing assembly furthermore includes a seal assembly as described above. The seal assembly in turn seals a bearing interior of the bearing assembly toward the main shaft, wherein the seal contact surface is preferably formed by the main shaft itself. Here the seal assembly can be attached both to an outer ring and to an inner ring.

A bearing assembly that is grease lubricated is particularly advantageous.

Further advantages and advantageous embodiments are specified in the description, the drawings, and the claims. Here in particular the combinations of features specified in the description and in the drawings are purely exemplary, so that the features can also be present individually or combined in other ways.

In the following the invention will be described in more detail based on exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following identical or identically operating elements are indicated by the same reference numbers.

Figure 1:
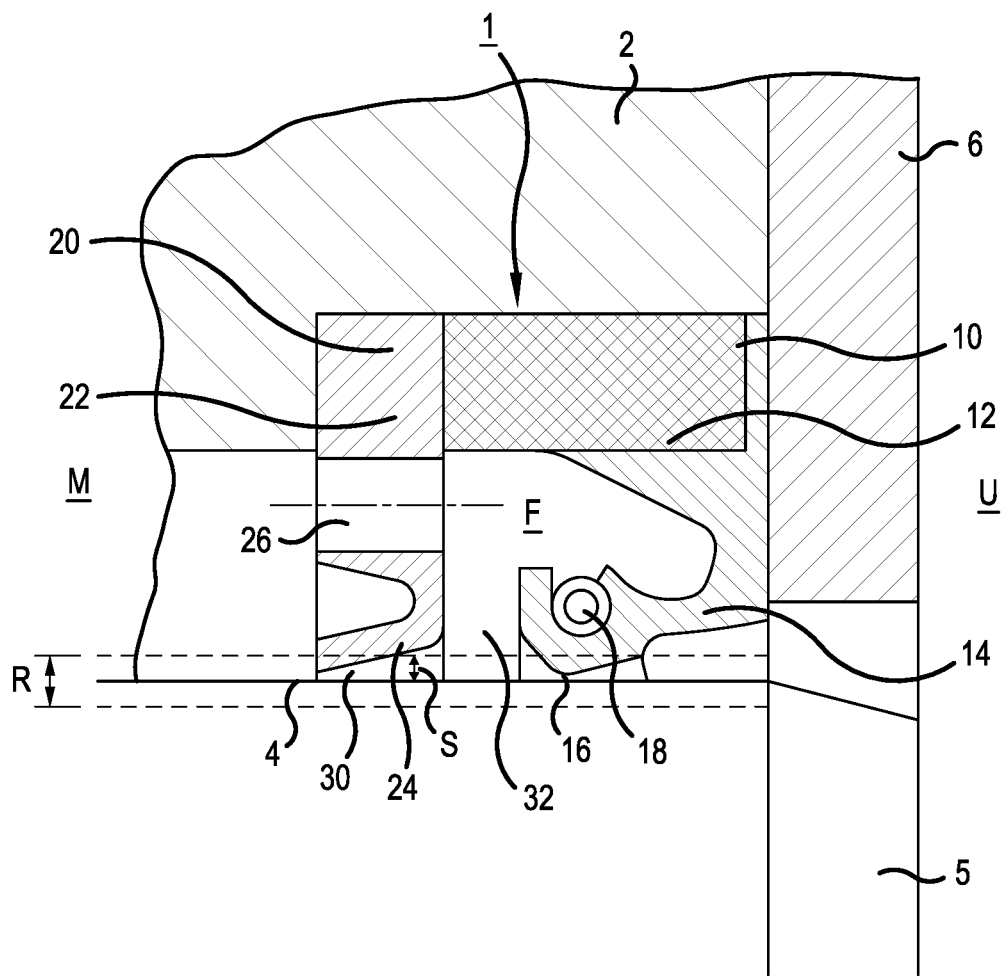
FIG. 1 is a schematic sectional view through a preferred exemplary embodiment of the seal assembly of the present disclosure.

FIG. 1 schematically shows a sectional view through a seal assembly 1 that is carried by a seal carrier 2, which is disposed in a housing or an outer ring of a not-depicted bearing. Of course, the seal carrier 2 can also be disposed on an inner ring of a bearing, and be attached either to the rotating or to the fixed component. The following description correspondingly applies analogously for the other designs.

The seal assembly 1 is furthermore configured to seal a bearing interior M against an outer space U. Furthermore, as depicted in FIG. 1 the seal assembly 1 slips against a seal contact surface 4, which in the depicted exemplary embodiment is formed by a main shaft 5. Toward the outer side U the seal assembly 1 is attached to the seal carrier 2 using a cover plate 6. The seal assembly 1 is pressed axially in the seal carrier 2 by the cover plate 6.

As can furthermore be seen from FIG. 1, the seal assembly 1 comprises a radial shaft seal ring 10 and a grease flow regulation element 20 (pumping ring), which is also shaped like a seal ring. The radial shaft seal 10 is a conventional radial shaft seal including a carrier body 12 and lip elements 14 disposed thereon that include a seal edge 16 that is in contact with the seal contact surface 4. In order to further increase the contact pressure of the seal edge 16 of the seal lip 14, as is also known a worm spring or garter spring (coil spring) or also a leaf spring 18 are provided that presses the seal lip 14 against the seal contact surface 4.

Instead of an axial seal contact surface, as depicted here, the seal contact surface for the main seal can also be embodied radially in a known manner. The seal contact surfaces for main seal 10 and grease flow regulation element 20 can thus also have different orientations.

The grease flow regulation element 20 in turn also includes an annular disc shaped carrier 22 including a lip element 24 disposed thereon. The grease flow regulation element 10 can be configured one-part or multi-part and manufactured from one or more materials. It is preferably manufactured from an elastomeric or flexible material.

Figure 2A:
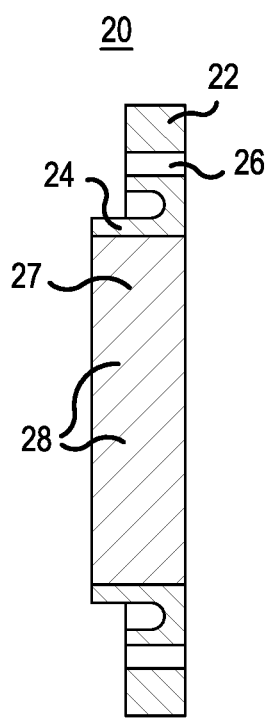
FIG. 2A is a sectional view of an element of the seal assembly of FIG. 1.
Figure 2B:
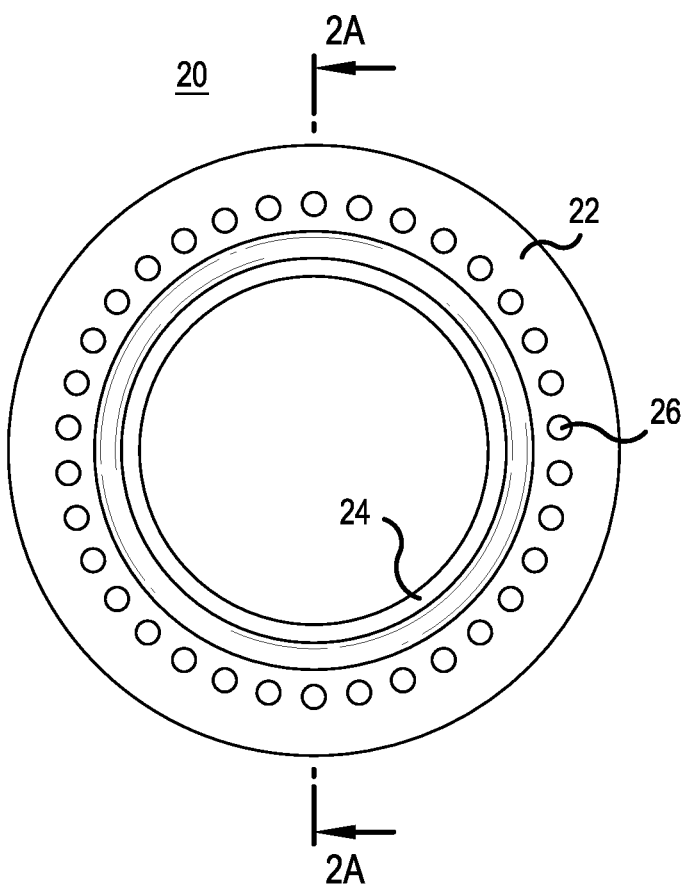
FIG. 2B is a plan view of the element of FIG. 2A.

The grease flow regulation element 20 is depicted in detail in FIGS. 2A-2B. In addition to the lip element 24 the grease flow regulation element includes uniformly circumferentially distributed through-openings 26 that fluidically connect the bearing interior M to a grease receiving space F that is formed between the grease flow regulation element 20 and radial shaft seal 10 (see FIG. 1). As furthermore depicted in FIG. 2A, the slip surface 27 of the lip 24 that faces the contact surface 4 includes grease transport structures 28 in the form of transverse grooves or ribs. These grease transport structures 28 serve as hydrodynamic auxiliary structures in order to transfer grease from the grease receiving space F into the bearing interior M when the bearing is in operation and the slip surface 27 of the lip element 24 is in contact with the seal contact surface 4. For this purpose the grease transport structures 28 in the exemplary embodiment depicted in FIG. 2A are configured as transversely extending structures that, depending on the direction of rotation, transport grease from the grease receiving space F toward the bearing interior M in a manner similar to an Archimedes' screw.

As can furthermore be seen from FIG. 1, in the resting state the seal element 24 includes an annular gap 30 with respect to the seal contact surface 4, so that in the resting position and with preferably concentric installation the lip element by and large, up to possible tolerance-induced deviations, does not contact the seal contact surface 4. Here a gap dimension S of the annular gap 30 is preferably dimensioned such that a running inaccuracy R of the shaft or of the seal contact surface 4, which is delineated in FIG. 1 as dashed lines, is larger than the gap dimension S. Since the gap dimension S is smaller than the running inaccuracy R, it can be ensured that the lip element 24 can partially contact the seal contact surface 4 over the circumference.

In large rolling-element bearings the running inaccuracy usually arises due to a large load or also due to the weight of the elements to be supported, for example, of rotor blades of a wind turbine, which lead to a bending or deformation of the bearing shaft, which in turn results in the running inaccuracy.

As explained in more detail below in connection with FIGS. 3A-3C, this running inaccuracy R is exploited so that dynamic grease that would collect in the grease receiving space F, and in particular in a region 32 in front of the seal lip 14 of the radial shaft seal ring 10, can be discharged.

Figure 3A:
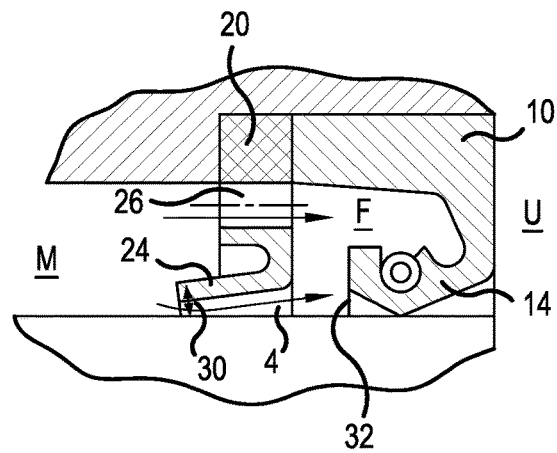
FIG. 3A is an additional sectional view of a portion of the seal assembly of FIG. 1.
Figure 3B:
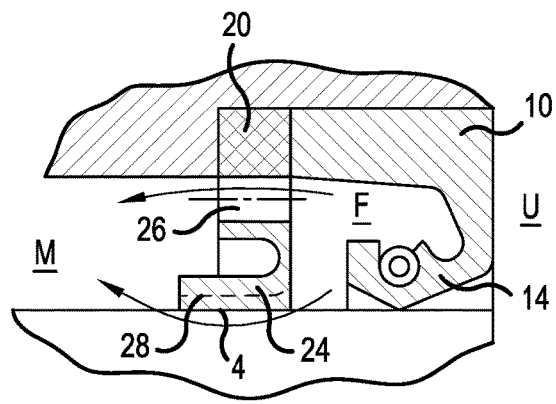
FIG. 3B is an additional sectional view of a portion of the seal assembly of FIG. 1.
Figure 3C:
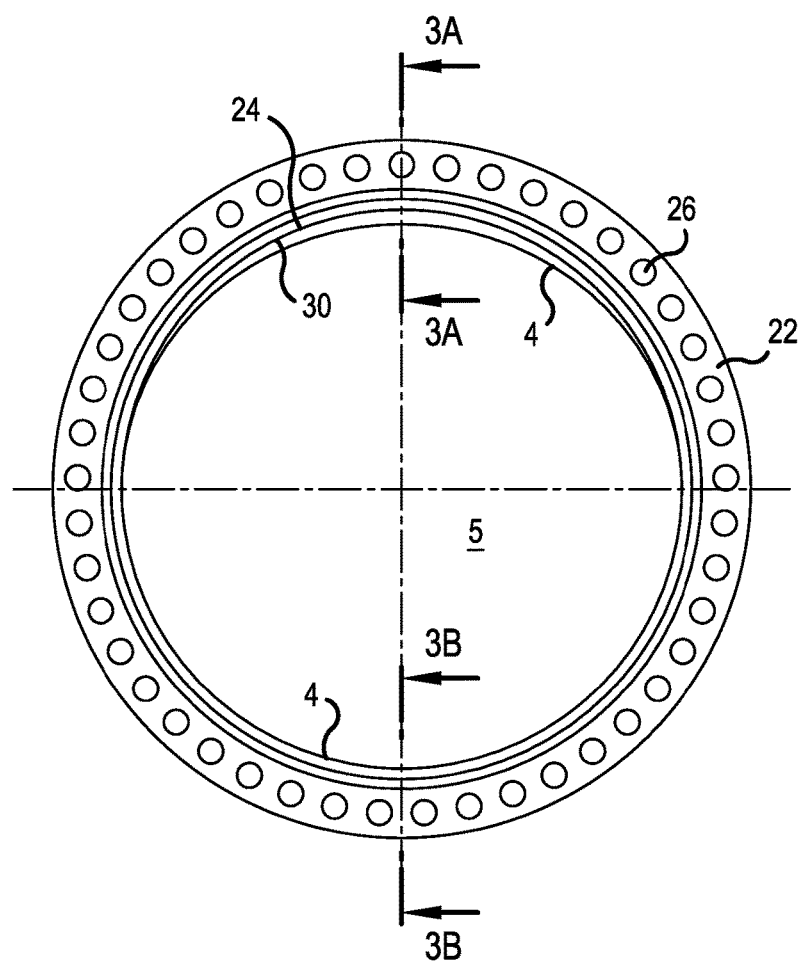
FIG. 3C is an additional plan view of the seal assembly of FIG. 1

The functioning of the grease flow regulation element 1 is explained in particular with respect to FIGS. 3A-3C. Here in plan view FIG. 3C shows the grease flow regulation element 20 including the circumferentially distributed through-openings 26 and the lip element that is disposed around the main shaft 5. In the region A at approximately 12:00 o'clock the lip element 24 is spaced by a spacing 30 from the seal contact surface 4, while in the region B the lip element 24 abuts directly against the seal contact surface 4. A crescent-shaped annular gap 30 thus arises that extends in the upper region in the exemplary embodiment depicted.

This is also depicted in the partial FIGS. 3A and B, wherein in partial FIG. 3A the lip element 24 of the grease flow regulation element 20 is spaced by a gap from the seal contact surface 4, while in FIG. 3B the lip element 24 contacts the seal contact surface 4.

Furthermore, the grease movement is illustrated in FIGS. 3A and 3B with the aid of the arrows. In the situation depicted in FIG. 3A, wherein the lip element 24 is spaced from the seal surface 4, the seal lip 14 of the radial shaft seal ring 10 is also applied against the seal surface 4 under normal abutment force. In this situation grease can be transferred from the bearing interior M into the grease receiving space F in order to provide grease onto the radial shaft seal element 10 in order to reduce friction. Here due to the limited flow-through pathways 26 (through-openings) or 30 (annular gap), the grease flow regulation element 20 already reduces the amount of lubricant that could collect in a region 32 on the seal lip 14, and on the one hand can lift the main lip by shear flows; on the other hand the same can also load with additional pressure by mass accumulation, which would increase the friction. In this respect it is ensured that there is an optimal seal contact of the seal lip 14 with respect to the seal surface 4, with simultaneous minimal possible wear of the seal lip 14.

However, to prevent too much grease from flowing into the grease receiving region F, in the region B that is depicted in FIG. 3B a situation is provided wherein the seal lip 24 of the grease flow regulation element 20 is in contact with the seal contact surface 4. This usually arises due to running inaccuracies along the shaft 5 due to, for example, bending of the shaft 5 due to large loads to be supported. In the example depicted in FIG. 3B, the lip element 24 abuts by its slip surface 27 directly against the seal contact surface 4. Using the grease-transport structures 28, grease can then be actively transported or suctioned or pumped from the grease receiving space F toward the bearing interior M. The seal lip 14 of the radial shaft seal ring 10 is also simultaneously pressed more strongly onto the seal contact surface 4, so that the grease receiving space F is reduced overall. In order to thereby not increase the grease pressure into the grease receiving space F, grease can furthermore flow via the through-openings 26 into the bearing interior M.

Via the running inaccuracy or also via corresponding installation layers or designs of the grease flow regulation element 20, it is thus achieved that at least two regions A, B arise over the circumference, wherein in the first region (see FIG. 3A) grease is supplied to the radial shaft seal 10, while in the region B (see FIG. 3B) grease is discharged from the grease receiving space F and away from the radial shaft seal toward the bearing interior M. On the one hand a uniform grease pressure on the seal lip 14 of the radial shaft ring 10 can thereby be ensured, and it can be ensured that a grease exchange is effected. In other words, the radial shaft seal and the pumping ring are mounted such that the at least one seal lip of the radial shaft seal is movable in a radial direction independently of the seal lip of the pumping ring and the seal lip of the pumping ring is movable in the radial direction independently of the at least one seal lip of the radial shaft seal. At the same time this prevents grease accumulation points from forming at which old grease collects, which could lead to a clumping. This in turn can also lead to increased heat and increased friction. In addition, due to the pumping effect of the grease flow regulation element 20, the grease can be kept in motion and rolled out, so that overall the performance of the lubrication capacity of the grease is significantly increased.

Figure 4:
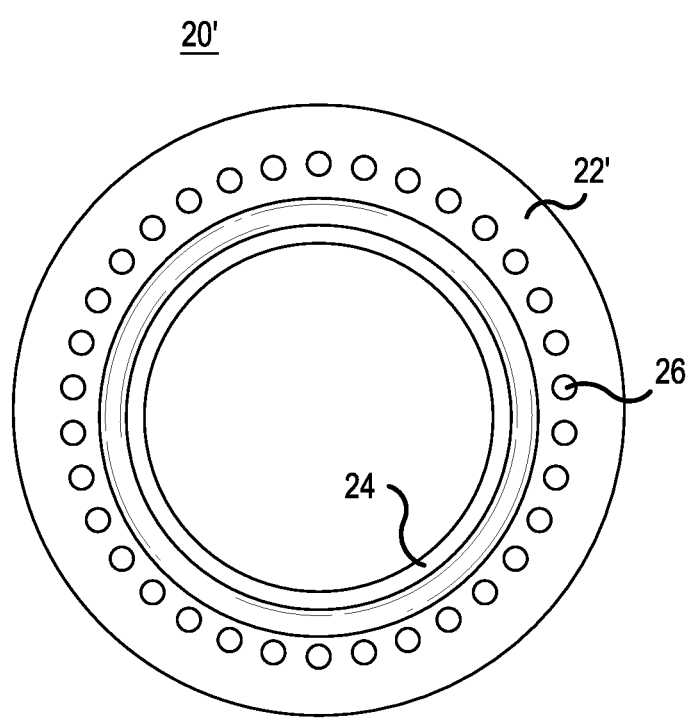
FIG. 4 is a plan view of an alternate embodiment of the element of FIG. 2A.

As mentioned above, the gap 30 can be achieved via the running inaccuracy of the shaft; however, it is also possible to correspondingly geometrically adapt the grease flow regulation element 20 itself. For example, this can be achieved by a slight malpositioning during installation; however, it is also possible to provide a modified disc-shaped carrier 22' of a grease flow regulation element 20' that has a different radial width over the circumference as illustrated in FIG. 4.

In addition, the grease flow regulation element can also be operated without the described ring gap when the through-openings in the grease flow regulation element completely assume the function of allowing grease to pass from the region of the rolling elements into the grease receiving space in front of the seal lip of the main seal.

Overall, using the proposed grease flow regulation element, on the one hand the grease pressure on the seal lip of the radial shaft seal ring can be reduced overall, and on the other hand an active grease flow influencing is achieved that leads to a replacement of grease in the region of the radial shaft seal ring. This in turn leads to an increased service life and a removal of heat, so that reduced seal wear and a reduced energy requirement of the entire system can be achieved.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seal assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Seal assembly
2 Seal assembly carrier
4 Seal contact surface
5 Shaft
6 Cover
10 Radial shaft seal
12 Radial shaft seal carrier
14 Radial shaft seal lip
16 Seal edge
18 Garter spring
20 Grease flow regulation element
22 Carrier
24 Lip element
26 Through-opening
27 Slip surface
28 Grease-transport structure
30 Annular gap
32 Grease accumulation point
M Bearing interior
U Outer environment
F Grease receiving space
R Running inaccuracy
S Gap dimension

What is claimed is:
1. A seal assembly for sealing a grease lubricated large rolling-element bearing, comprising:
   a radial shaft seal having at least one seal lip configured to sealingly abut against a rotating shaft in order to seal a bearing interior and substantially prevent a grease discharge from the bearing, and
   grease flow regulation means for regulating a grease pressure at the at least one seal lip, the grease flow regulation mean being mounted at a side of the shaft seal that is intended to face the bearing interior in an installed state, wherein the grease flow regulation means is axially spaced from the radial shaft seal such that a grease-receiving space is formed between the radial shaft seal and the grease flow regulation means, and wherein the grease flow regulation means includes a plurality of through openings.

2. The seal assembly according to claim 1, wherein the through openings are uniformly circumferentially distributed.

3. The seal assembly according to claim 1, wherein the grease flow regulation means comprises an annular pumping ring having a seal lip facing the shaft.

4. A sealed shaft assembly comprising the seal assembly according to claim 3 mounted on the shaft, wherein a difference between an inner diameter of the pumping ring and an inner diameter of the radial shaft seal produces a gap between the pumping ring and the shaft, and wherein the difference is selected such that a size of the gap is smaller than an expected running inaccuracy of shaft.

5. The sealed shaft assembly according to claim 4, wherein the size of the gap varies around a circumference of the shaft.

6. The seal assembly according to claim 3, wherein the pumping ring includes a carrier supporting the seal lip of the pumping ring, and the carrier and the seal lip of the pumping ring are formed one-piece.

7. The seal assembly according to claim 6, wherein a radial width of the pumping ring varies over a circumference of the pumping ring.

8. The seal assembly according to claim 3, wherein a radially inner surface of the seal lip of the pumping ring includes at least one groove or at least one rib.

9. The seal assembly according to claim 8, wherein the at least one groove or the at least one rib are uniformly circumferentially distributed.

10. The seal assembly according to claim 3, wherein the radial shaft seal and the pumping ring are mounted such that the at least one seal lip of the radial shaft seal is movable in a radial direction independently of the seal lip of the pumping ring and the seal lip of the pumping ring is movable in the radial direction independently of the at least one seal lip of the radial shaft seal.

11. A bearing assembly of a wind turbine for supporting a main shaft of a wind turbine including a seal assembly according to claim 3.

12. A seal assembly for sealing a grease lubricated large rolling-element bearing, comprising:

a radial shaft seal having at least one seal lip configured to sealingly abut against a rotating shaft in order to seal a bearing interior and substantially prevent a grease discharge from the bearing, and grease flow regulation means for regulating a grease pressure at the at least one seal lip, the grease flow regulation mean being mounted at a side of the shaft seal that is intended to face the bearing interior in an installed state, wherein the grease flow regulation means comprises an annular pumping ring having a seal lip facing the shaft, and wherein either an inner diameter of the pumping ring is greater than an inner diameter of the radial shaft seal, or wherein a first portion of the seal lip of the pumping ring contacts the shaft and a second portion of the seal lip of the pumping ring is spaced from the shaft by a crescent-shaped gap.

13. The seal assembly according to claim 12, wherein the annular pumping ring includes a plurality of through-openings.

14. A sealed shaft assembly comprising:

a seal carrier having an opening, a rotatable shaft extending through the opening and having an outer diameter, a radial shaft seal supported by the seal carrier, the radial shaft seal surrounding the shaft and having a first seal lip sealingly abutting against the shaft, and a pumping ring supported by the seal carrier at an axial distance from the radial shaft seal, the pumping ring having a second seal lip configured to sealing abut against the shaft and a plurality of circumferentially spaced through openings.

15. The sealed shaft assembly according to claim 14, wherein a first portion of the second seal lip contacts the shaft and a second portion of the second seal lip is spaced from the shaft by a crescent-shaped gap.

16. The sealed shaft assembly according to claim 14, wherein an inner diameter of the second seal lip is greater than the outer diameter of the shaft such that a gap is formed between the second seal lip and the shaft.

17. The sealed shaft assembly according to claim 14, wherein the radial shaft seal and the pumping ring are mounted such that first seal lip is movable in a radial direction independently of the second seal lip and the second seal lip is movable in the radial direction independently of the first seal lip.

18. The sealed shaft assembly according to claim 14, wherein the pumping ring includes an annular body supporting the second seal lip, wherein the annular body and the second seal lip are formed one-piece, and wherein a radial width of the pumping ring varies around a circumference of the pumping ring such that a width of a gap between shaft and the second seal lip varies around a circumference of the shaft.

\* \* \* \* \*